(12) United States Patent
Hu

(10) Patent No.: US 9,722,354 B2
(45) Date of Patent: Aug. 1, 2017

(54) ELECTRONIC CARD CONNECTOR HAVING IMPROVED SHIELDING SHELL FOR ELECTROSTATIC DISCHARGE PROTECTION

(71) Applicant: FOXCONN INTERCONNECT TECHNOLOGY LIMITED, Grand Cayman (KY)

(72) Inventor: Gang Hu, Huaian (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/228,218

(22) Filed: Aug. 4, 2016

(65) Prior Publication Data
US 2017/0040742 A1  Feb. 9, 2017

(30) Foreign Application Priority Data

Aug. 4, 2015 (CN) ............ 2015 1 0469802
Aug. 28, 2015 (CN) ............ 2015 1 0537612
Dec. 24, 2015 (CN) ............ 2015 1 0978813

(51) Int. Cl.
*H01R 13/62* (2006.01)
*H01R 13/635* (2006.01)
*H01R 12/73* (2011.01)
*H01R 13/41* (2006.01)
*H01R 13/648* (2006.01)

(52) U.S. Cl.
CPC .......... *H01R 13/635* (2013.01); *H01R 12/73* (2013.01); *H01R 13/41* (2013.01); *H01R 13/6485* (2013.01)

(58) Field of Classification Search
CPC .................................. H01R 13/635
USPC ........................................... 439/159
See application file for complete search history.

(56) References Cited

U.S. PATENT DOCUMENTS

| 7,867,034 B1* | 1/2011 | Sato | G06K 7/0043 439/159 |
| 8,517,745 B1* | 8/2013 | Yang | H01R 12/721 439/152 |
| 8,535,099 B1* | 9/2013 | Lin | H01R 12/7052 439/607.33 |
| 8,777,669 B2 | 7/2014 | Hu et al. | |

(Continued)

FOREIGN PATENT DOCUMENTS

| CN | 202111267 | 1/2012 |
| TW | M302792 | 12/2006 |

(Continued)

*Primary Examiner* — Phuong Dinh
(74) *Attorney, Agent, or Firm* — Wei Te Chung; Ming Chieh Chang

(57) ABSTRACT

An electronic card connector, cooperated with a plug-in component and defining an insertion direction and a transverse direction perpendicular to the insertion direction, includes an insulative housing, a number of contacts retained in the insulative housing, a metal shell attached to the insulative housing and forming a cavity therebetween, and an ejector movable in the insulative housing. The metal shell has a number of lateral walls located at two sides and a front end thereof. One of the lateral walls has a resisting portion protruding to the cavity and resists the resisting portion to confine a movement thereof in a horizontal plane.

1 Claim, 13 Drawing Sheets

(56) References Cited

U.S. PATENT DOCUMENTS

| | | | |
|---|---|---|---|
| 8,858,247 B2 | 10/2014 | Zhu et al. | |
| 9,190,775 B2 | 11/2015 | Zhu et al. | |
| 2013/0040478 A1* | 2/2013 | Hsu | G06K 13/085 439/159 |
| 2014/0187067 A1* | 7/2014 | Zhu | H01R 13/635 439/159 |

FOREIGN PATENT DOCUMENTS

| | | |
|---|---|---|
| TW | M387408 | 8/2010 |
| TW | M419263 | 6/2011 |
| TW | M505734 | 3/2015 |
| TW | M504370 | 7/2015 |

\* cited by examiner

ELECTRONIC CARD CONNECTOR HAVING IMPROVED SHIELDING SHELL FOR ELECTROSTATIC DISCHARGE PROTECTION

BACKGROUND OF THE INVENTION

1. Field of the Invention

The present invention relates generally to an electronic card connector, and more particularly to an electronic card connector having improved shielding for electrostatic discharge protection.

2. Description of Related Arts

Taiwan Patent No. M419263 discloses a card connector including a housing, a number of contacts, a lever, a cam, and a shell enclosing the housing. The shell includes a first elastic spring extending backwardly and downwardly and a second elastic spring bent downwardly. The first elastic spring has a bending portion and the second elastic spring has a dimple protruding downwardly. The bending portion orientates the lever and the dimple resists the slider when the slider movable in the sliding groove. Taiwan Patent No. M504370 discloses a card connector including a housing, a number of contacts, a lever, a cam linked with the lever, and a shell enclosing the housing. The shell includes a spring punched downwardly from a top wall and a projection located at the spring. The spring is resiliently resisted against the cam, when the lever is sliding in the groove.

However, the ejector is easy to move along an insertion direction or a transverse direction to produce noise or static electricity.

An electronic card connector having improved shielding shell is desired.

SUMMARY OF THE INVENTION

Accordingly, an object of the present invention is to provide an electronic card connector having improved shielding shell to prevent static electricity.

To achieve the above object, an electronic card connector, cooperated with a plug-in component and defining an insertion direction and a transverse direction perpendicular to the insertion direction, comprising: an insulative housing; a plurality of contacts retained in the insulative housing; a metal shell attached to the insulative housing and forming a cavity therebetween, the metal shell having a plurality of walls located at two sides and a front end thereof, one of the walls having a resisting portion protruding to the cavity; and an ejector movable in the insulative housing and resisted against by the resisting portion to confine a movement thereof in a horizontal plane.

DETAILED DESCRIPTION OF THE PREFERRED EMBODIMENT

Figure 1:
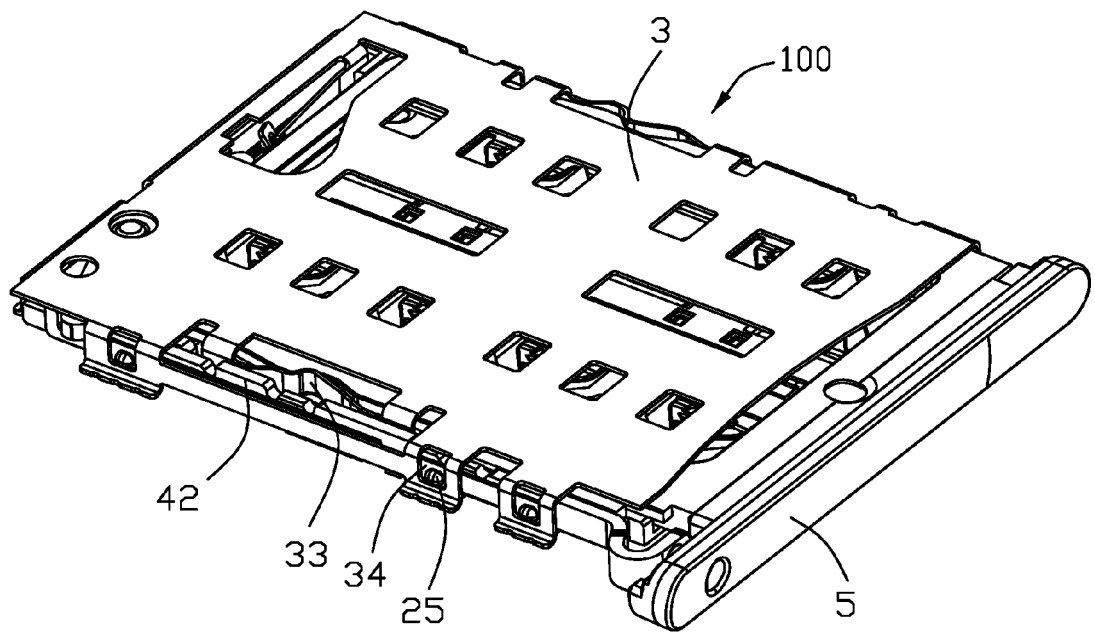
FIG. 1 is a perspective, assembled view of an electronic card connector in a first embodiment.

Reference will now be made in detail to the preferred embodiment of the present invention.

Referring to FIGS. 1 to 7, an electronic card connector 100 in a first embodiment of the present invention. Referring to FIGS. 1 to 7, the electronic card connector 100 includes an insulative housing 1, a terminal module 2 retained in the insulative housing 1, a shielding shell 3 shielding the insulative housing 1, an ejector 4 received in the insulative housing 1, a tray 5 movably in the insulative housing 1, and a switch 6 located at the insulative housing 1. For convenience, the electronic connector 100 defines an insertion direction and a transverse direction perpendicular to the insertion direction in FIG. 1.

Referring to FIGS. 3 to 7, the insulative housing 1 includes a base portion 11 and a pair of side portions 12 discontinuously located at two sides of the base portion 11. The base portion 11 defines two rows of the terminal-receiving slots 13. The side portion 12 in left defines an opening 14 in the middle thereof.

Referring to FIGS. 2 to 7, the terminal module 2 include a number of contacts 21 and a metal sheet 22 enclosing the contacts 21. Each contact 21 includes a contacting portion 211 protruding from the terminal-receiving slot 13, a connecting portion 212 retained in the insulative housing 1, and a soldering portion 213 used to connected with a printed circuit board. The contacts 21 is disposed in two groups along the insertion direction and connected electrically with an electrical card. The metal sheet 20 includes a bottom wall 22 in the left and a side wall 23 bent upwardly from the bottom wall 22. The side portion 12 together with the bottom wall 22 and the side wall 23 defines a sliding cavity 10. The side wall 23 has a resisting portion 24 located at an inner surface thereof and protruding to the sliding cavity 10 and a number of bulges 25 located at an outer surface.

Referring to FIGS. 1 to 7, the shielding shell 3 encloses the insulative housing 1 and connected with the metal sheet 20. The shielding shell 3 has a top wall 31, a pair of clasping springs 32 located at two sides, and a detecting portion 33 located at a front end thereof. The detecting portion 33 is cooperated with the switch 6 to check up if the electrical card is inserted. The clasping springs 32 are resisted against by the tray 5 when the tray 5 is inserted to prevent the tray 5 ejecting from the insulative housing 1 for shock and so on. The shielding shell 3 has a number of holes 34 located at two sides to receive the bulge 25 of the metal sheet 20 to connect the shielding shell 3 with the metal sheet 20 electrically.

Referring to FIGS. 2 to 6, the ejector 4 has a cam 41 located at a front end of the insulative housing 1 and a lever 42 located at the sliding cavity 10. The lever has a depression 421 located at a front end and a hook 422 located at a rear end. The cam 41 has a pushing portion 411 and an acting portion 412 cooperated with the lever 42. The acting portion 412 has a free end received in the depression 421 to link the cam 41 and the lever 42. A width of the sliding cavity 10 is bigger than that of the lever 42 along the transverse direction. The lever 42 is received in the sliding cavity 10 and sandwiched between the side portion 12 and the side wall 23. The lever 42 is resisted against by the resisting portion 24 to decrease sway in the sliding cavity 10 along the transverse direction. Moreover, the resisting portion 24 connected with the lever 42 to connect the metal sheet 20 and the shielding shell 3 and the cam 41 is linked with the lever 42 to derive the static electricity produced thereby via the metal sheet 20 in the movement to prevent damaging the electronic card connector 100, even the electrical device.

Figure 2:
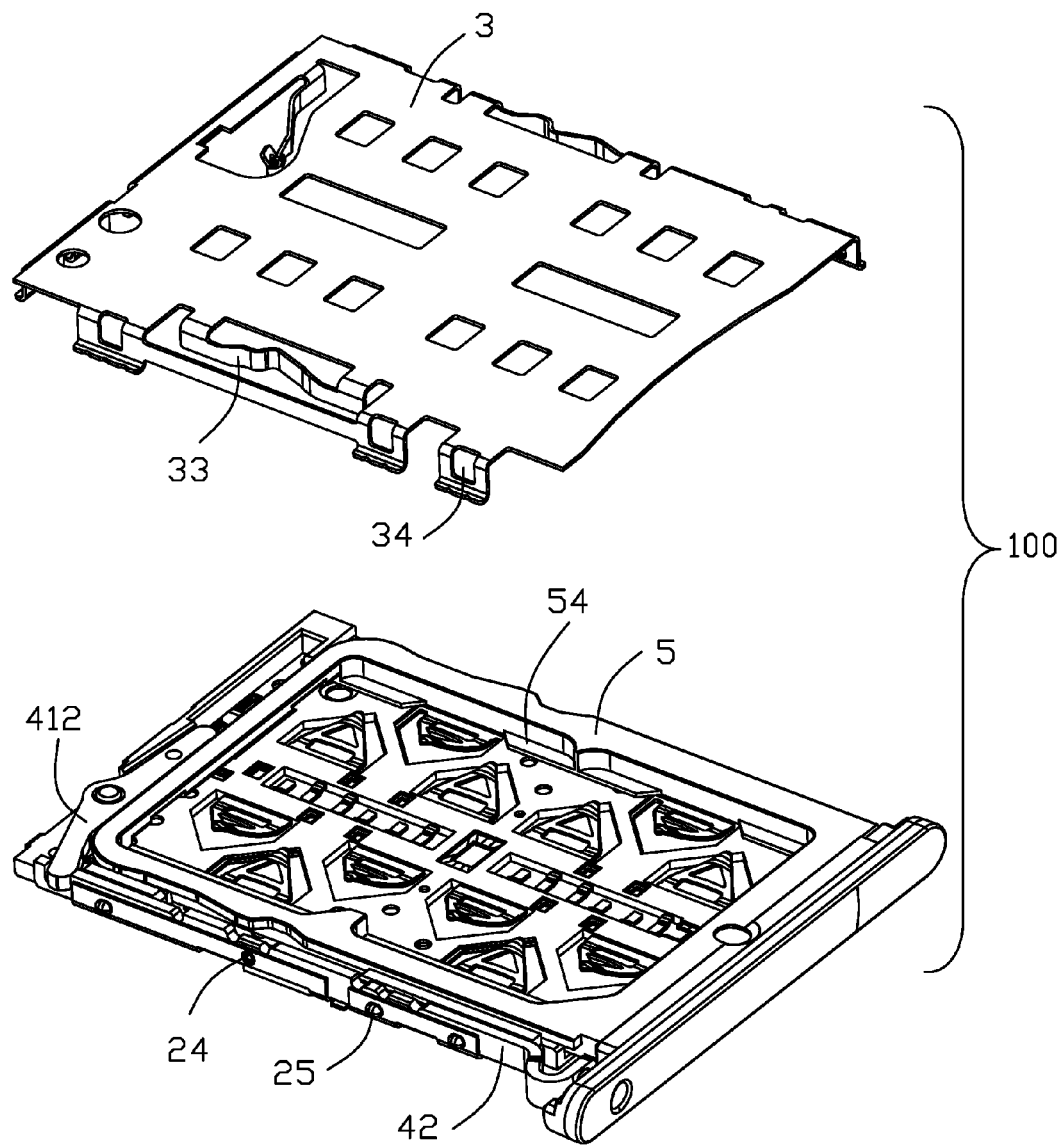
FIG. 2 is a perspective, partly exploded view of the electronic card connector in a first embodiment.
Figure 3:
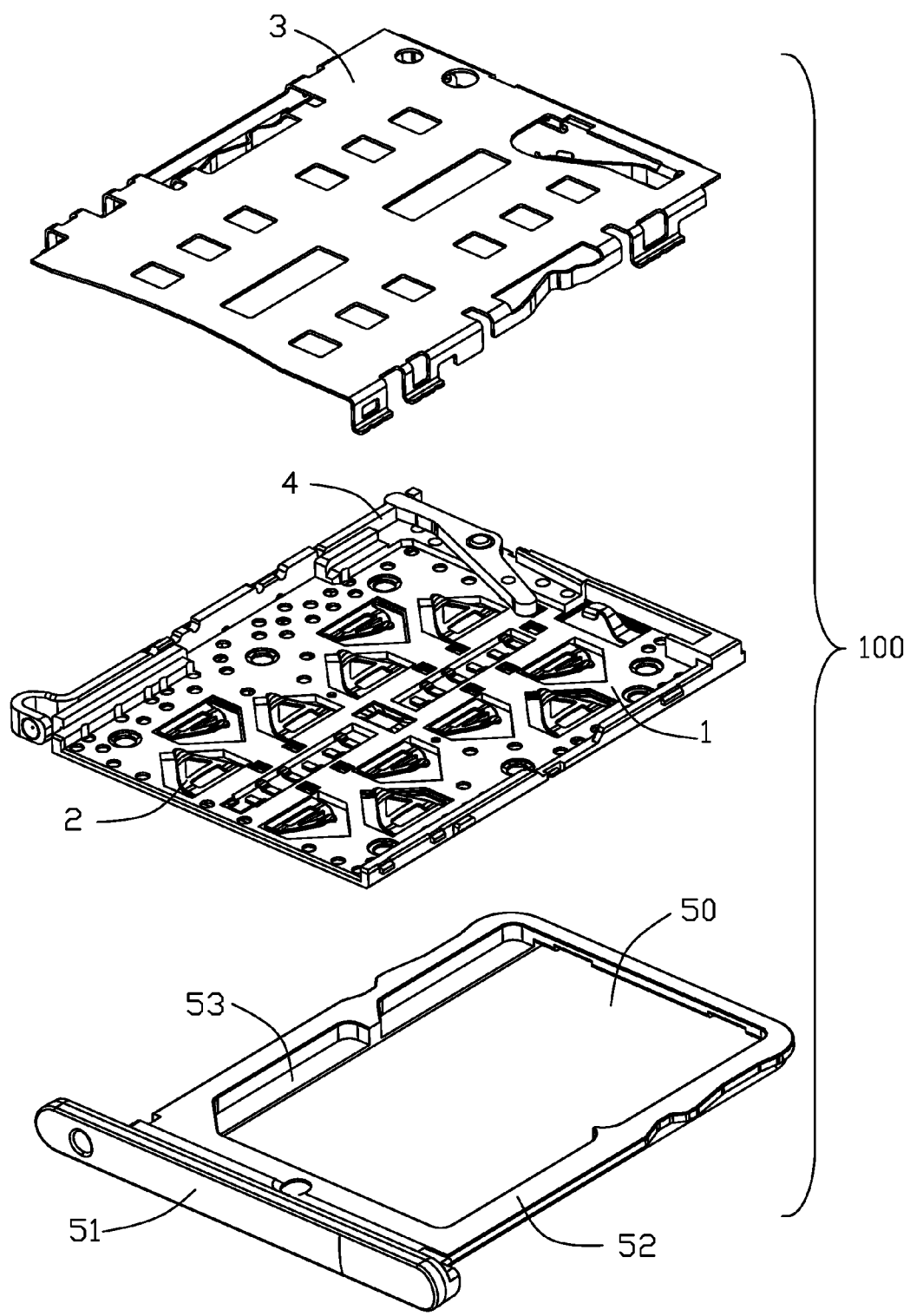
FIG. 3 is another perspective, partly exploded view of the electronic card connector in a first embodiment.
Figure 4:
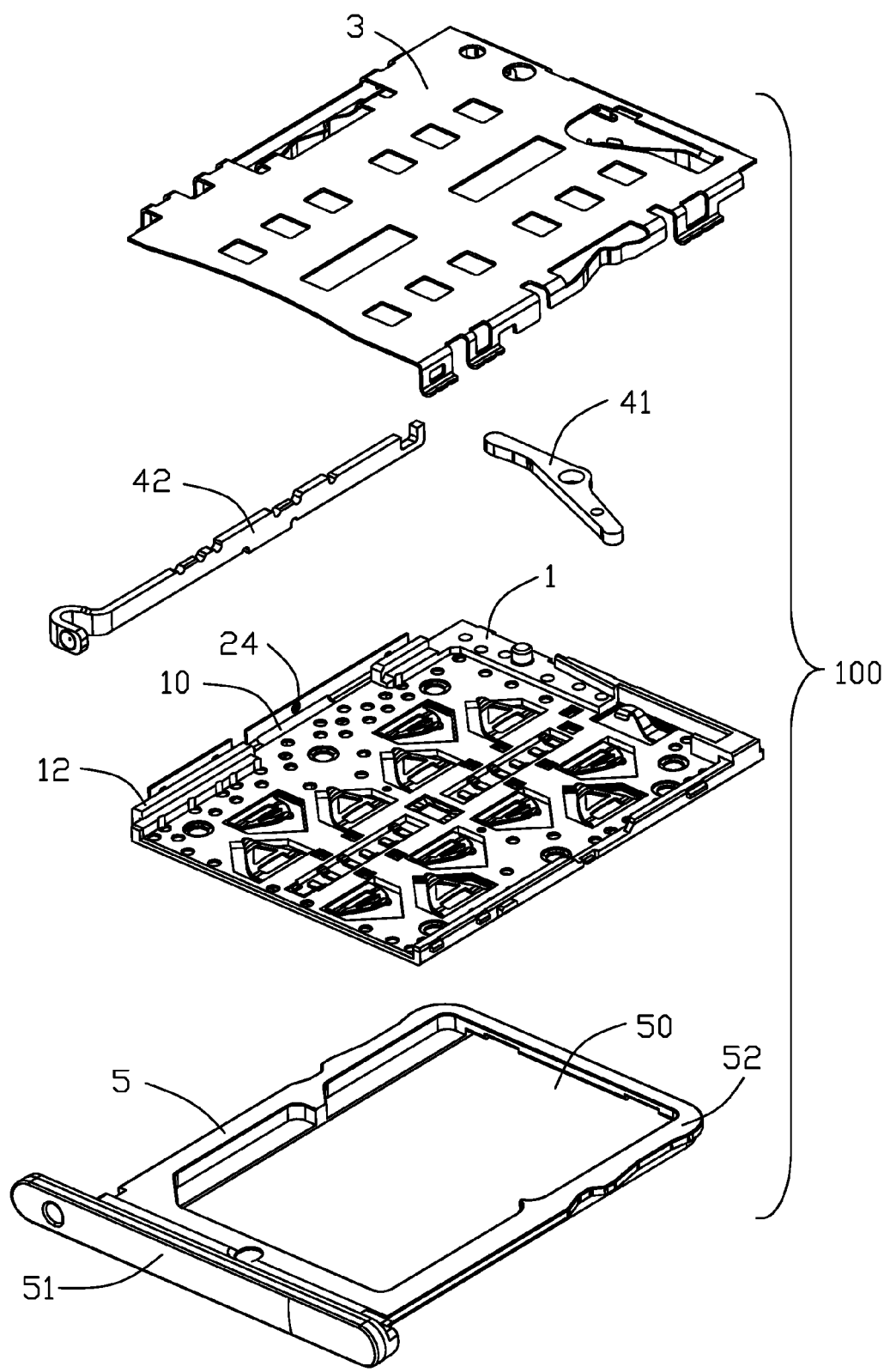
FIG. 4 is a perspective, exploded view of the electronic card connector in a first embodiment.
Figure 5:
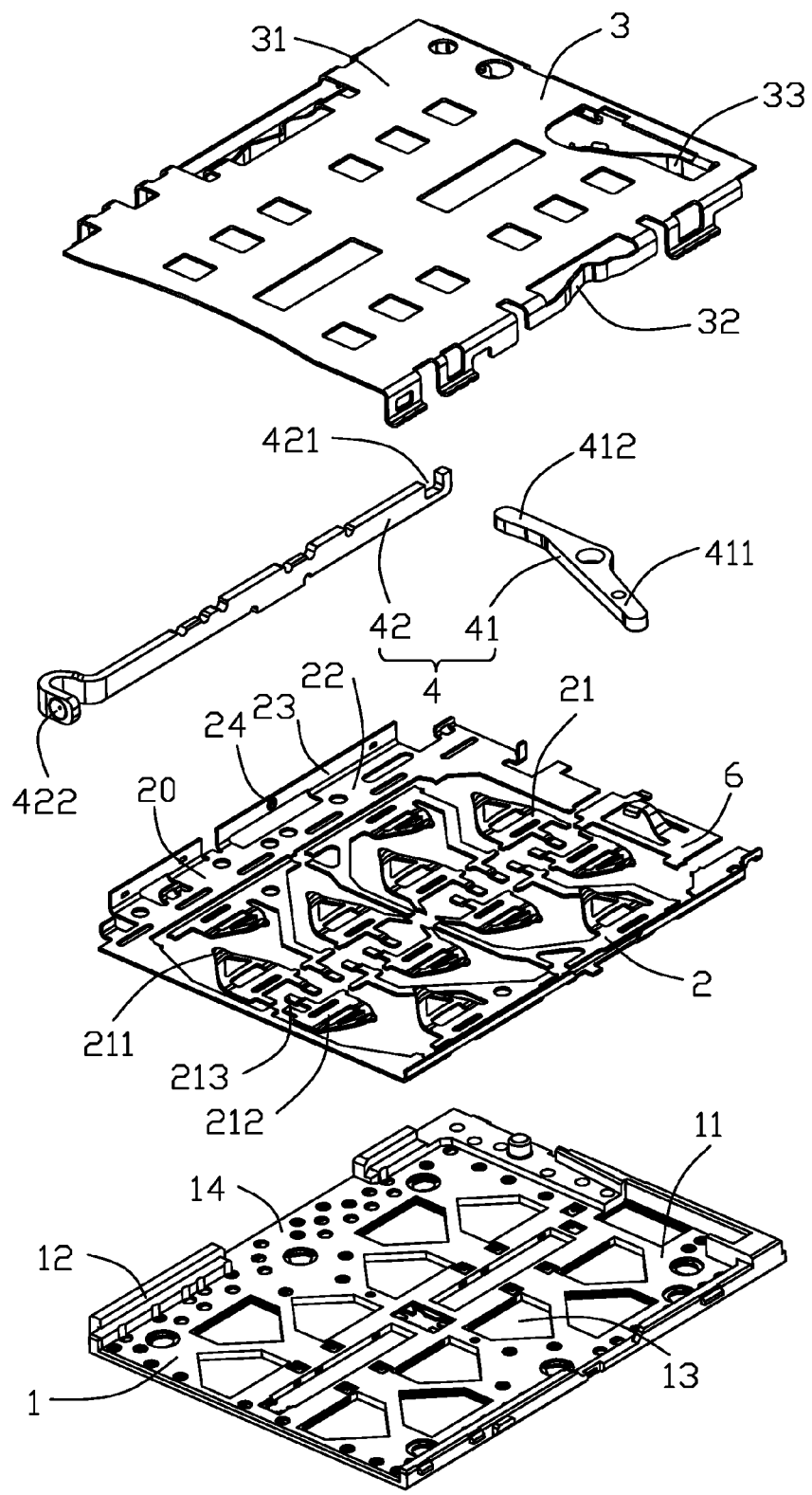
FIG. 5 is a perspective, exploded view of the electronic card connector in a first embodiment taken from another angle.
Figure 6:
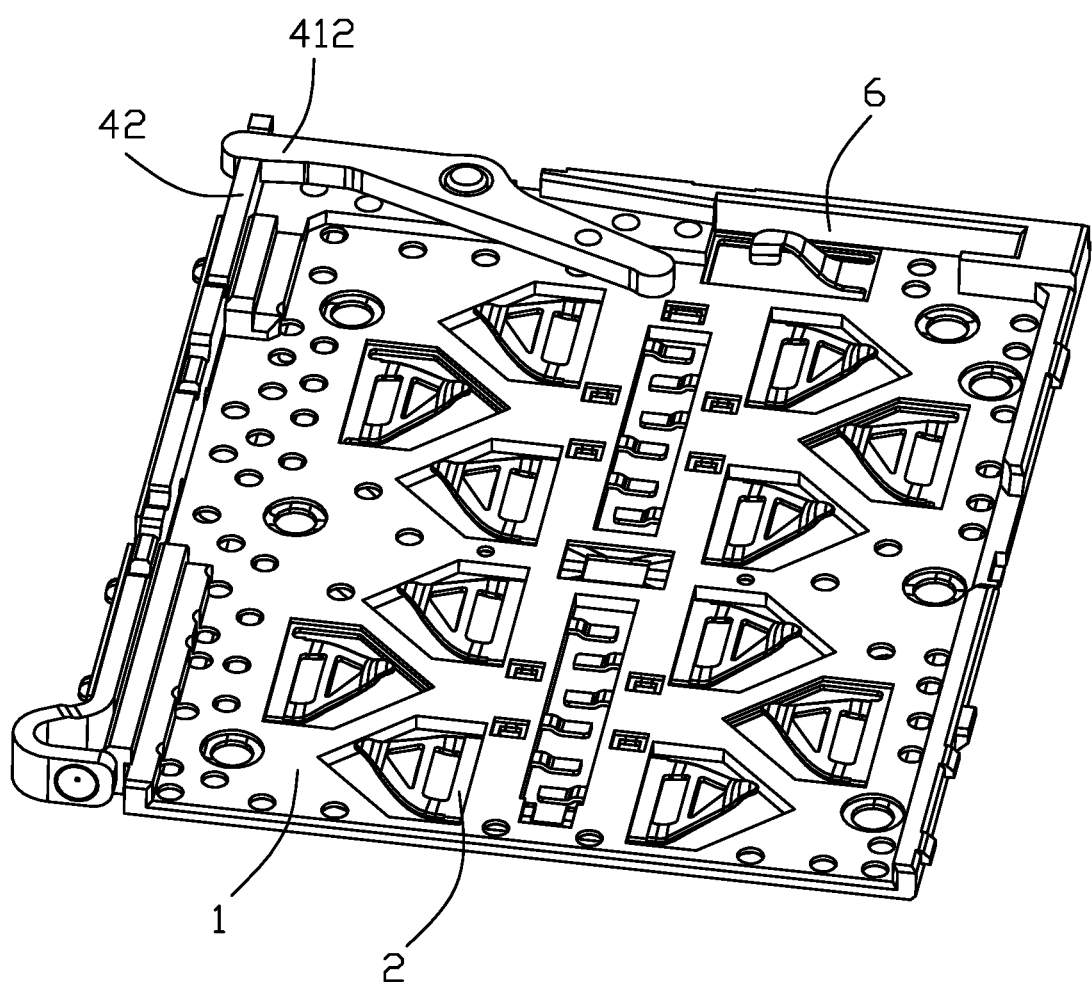
FIG. 6 is a perspective view of the electronic card connector with no shielding shell and no tray in a first embodiment.
Figure 7:
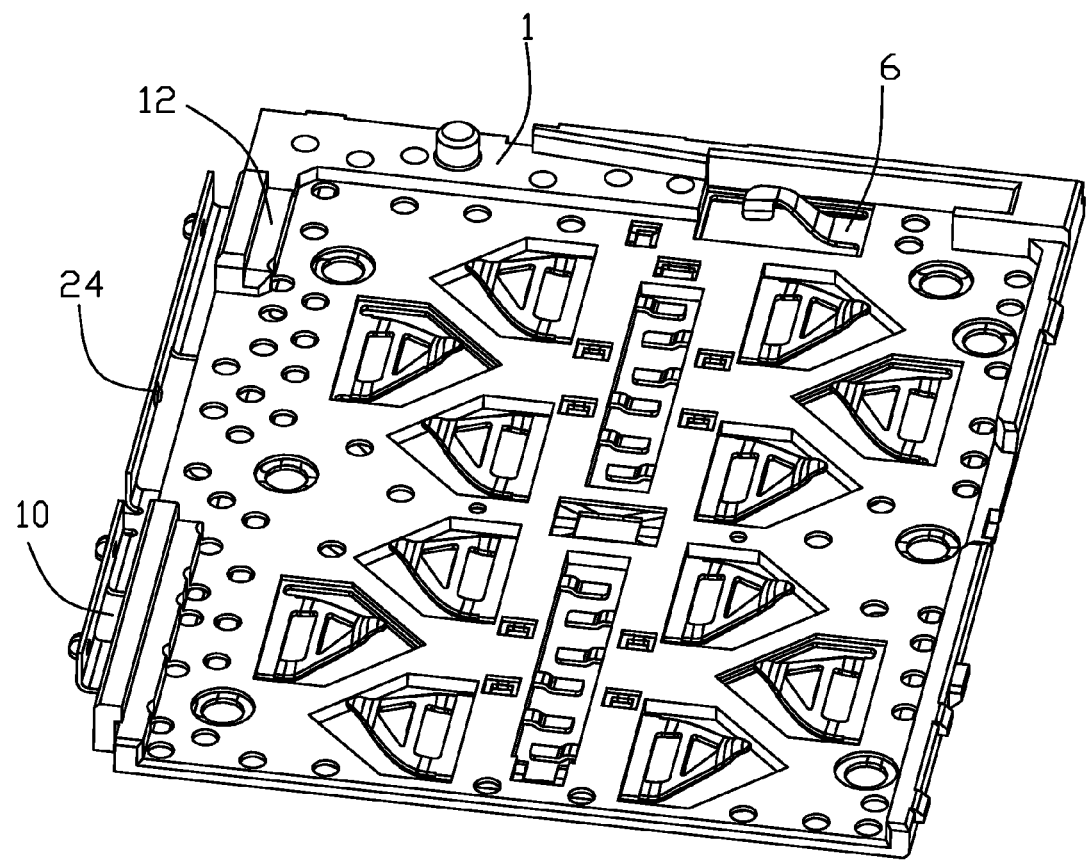
FIG. 7 is a perspective view of a metal sheet and a number of contacts retained in an insulative housing.

Referring to FIGS. 2 and 4, the tray 5 has an operating portion 51 located at a rear end and a loading portion 52 forming a receiving room 50 to carry the electronic card. The receiving room 50 defines a first supporting portion 53 and a second supporting portion 54 located at a bottom of two sides along the insertion direction. The second supporting portion 54 is discontinuously disposed.

Figure 8:
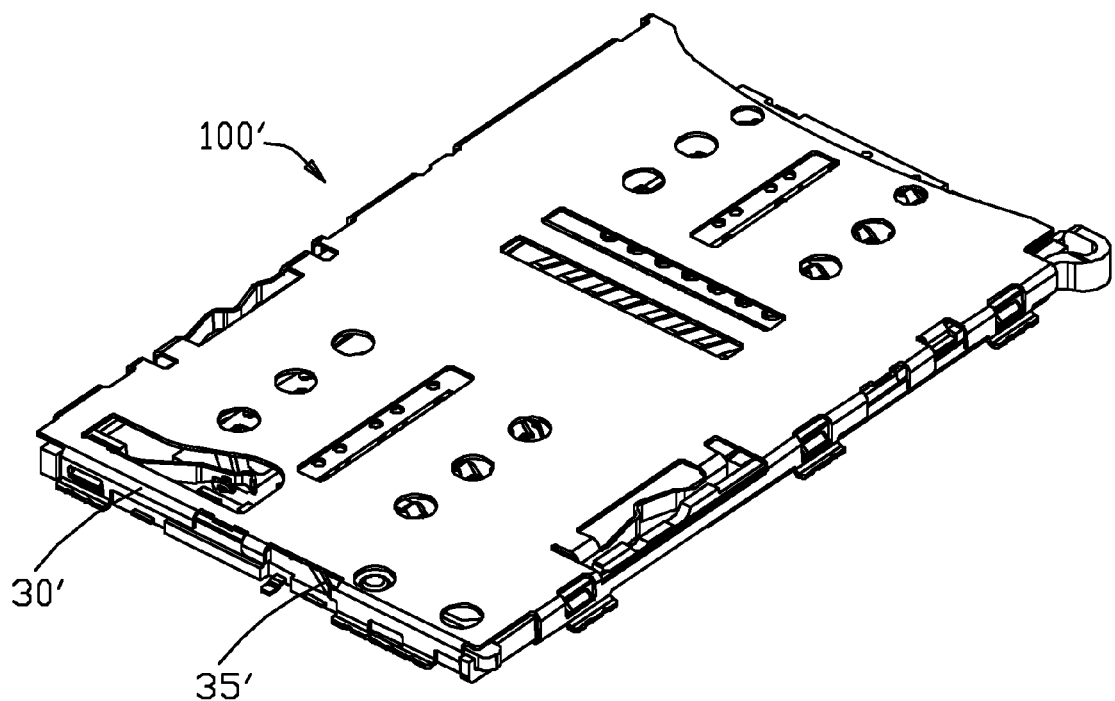
FIG. 8 is a perspective, assembled view of an electronic card connector in a second embodiment.
Figure 9:
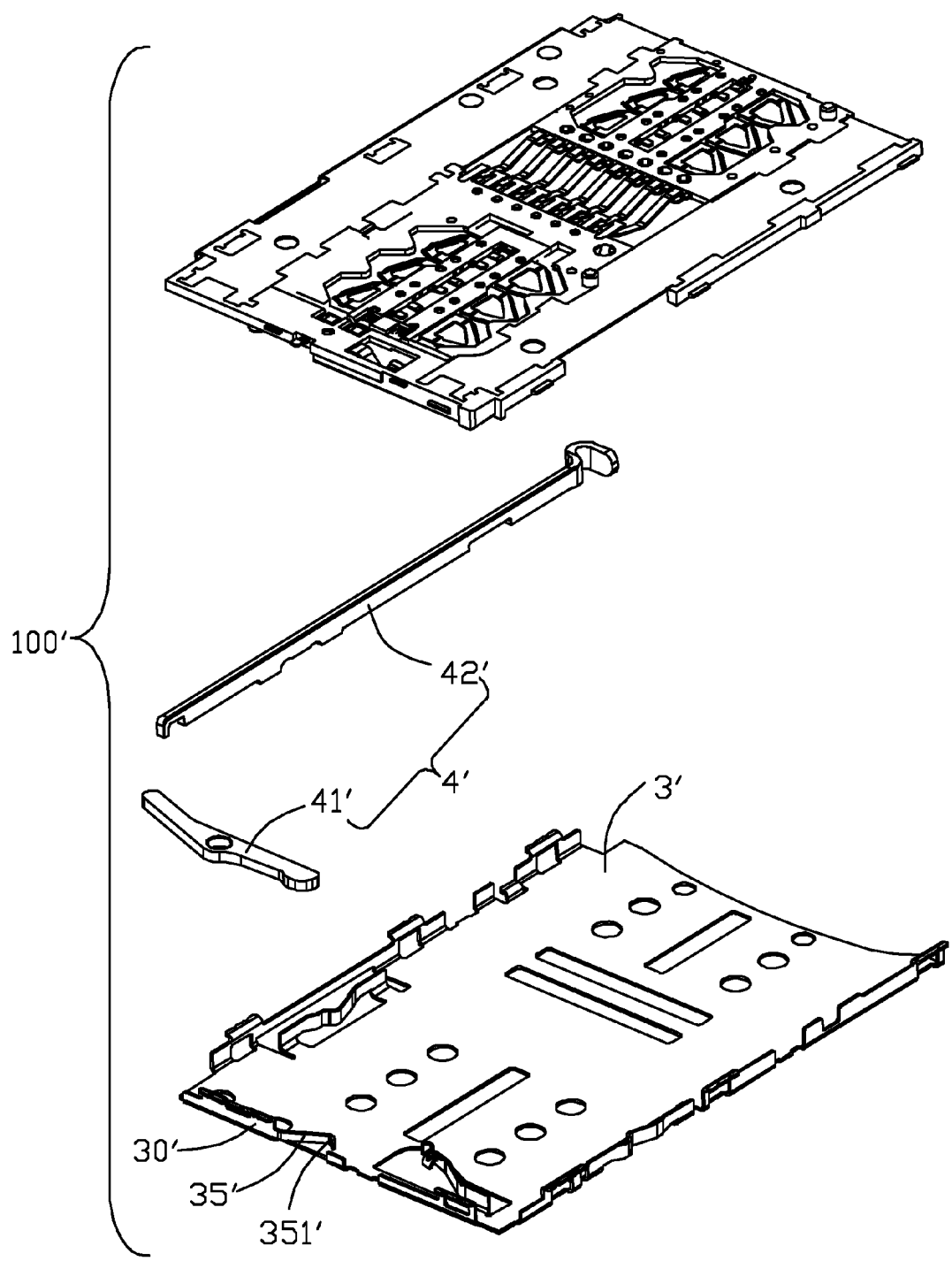
FIG. 9 is a perspective, exploded view of the electronic card connector in a second embodiment.
Figure 10:
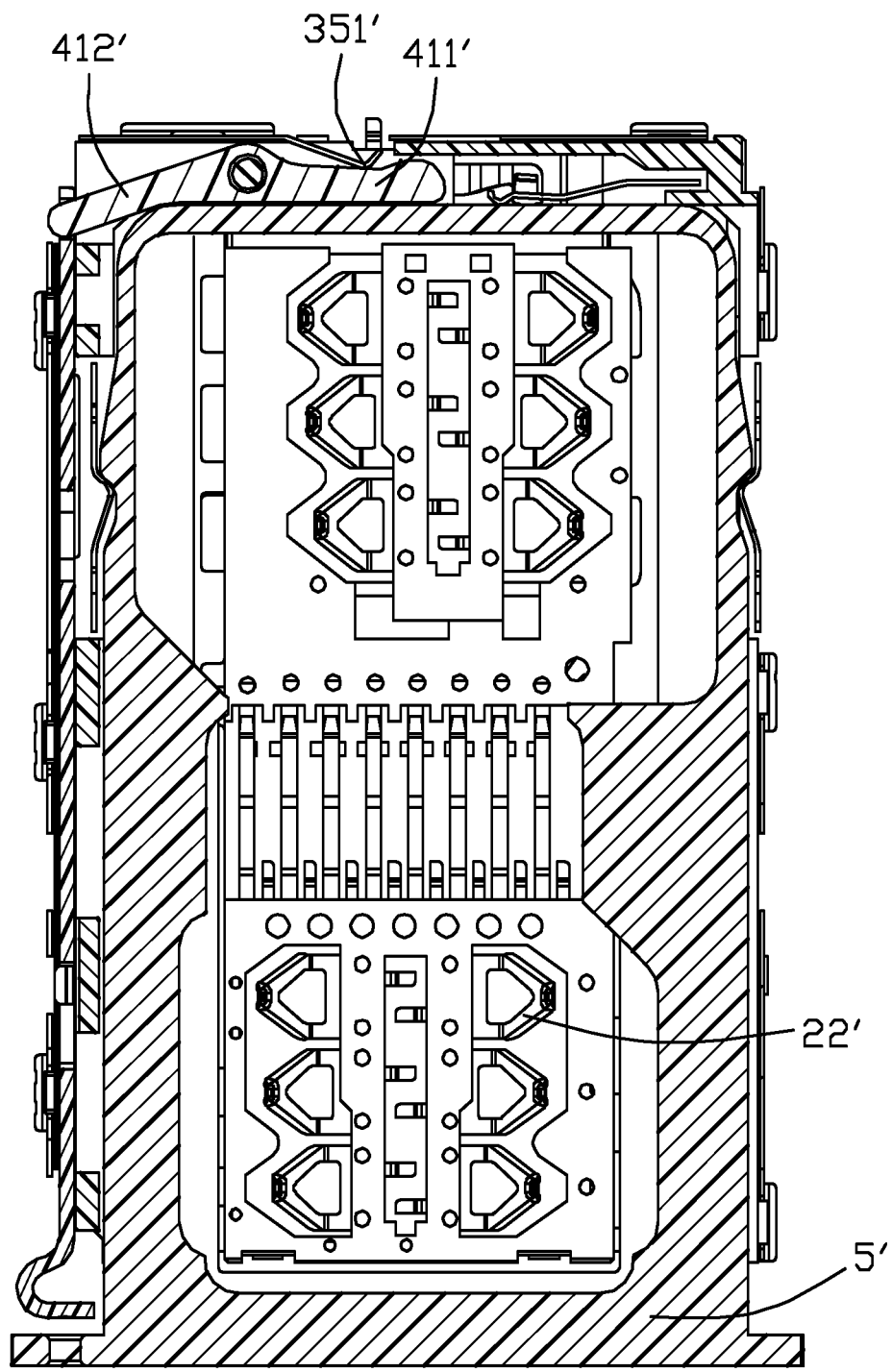
FIG. 10 is a cross-sectional view of the electronic card connector in a second embodiment.

Referring to FIGS. 8 to 10, an electronic card connector 100' in a second embodiment of the present invention includes an insulative housing 1', a number of contacts 22', a shielding shell 3' shielding the insulative housing 1', an ejector 4' received in the insulative housing 1', a tray 5' movably in the insulative housing 1', roughly same as the electronic card connector 100 in the first embodiment except the shielding shell 3'.

The shielding shell 3' has a top wall 31', a pair of side walls 32' extending along the insertion direction continuously and a front wall 30' located in front of a front end of the insulative housing 1'. The front wall 30' has a resisting portion 35' corresponding to the ejector 4'. The resisting portion 35' has a protrusion 351' protruding to an inner cavity and resiliently movable along the insertion direction. The protrusion 351' has a free end connected with the front wall 30' and another free end is separated from the front wall 30' as an elastic spring.

The ejector 4' has a cam 41' located at a front end of the insulative housing 1' and a lever 42' located beside one of the side walls 32'. The cam 41' has a pushing portion 411' and an acting portion 412' linked with the cam 41'. Referring to FIG. 10, the resisting portion 35' are resisted against by the pushing portion 411', and then the pushing portion 421' is driven by the tray 5' to push the resisting portion 35' movable forwardly. The pushing portion 411' of the cam 41' is confined between a front end of the tray 5' and the resisting portion 35' to decrease noise or static electricity produced by sway of the ejector 4' in working condition. In ejecting process, the lever 42' is pushed forwardly to drive the cam 41' to rotate clockwise, then the tray 5' is driven by the acting portion 412' to withdraw, and the resisting portion 35' is separated from the cam 41'.

Figure 11:
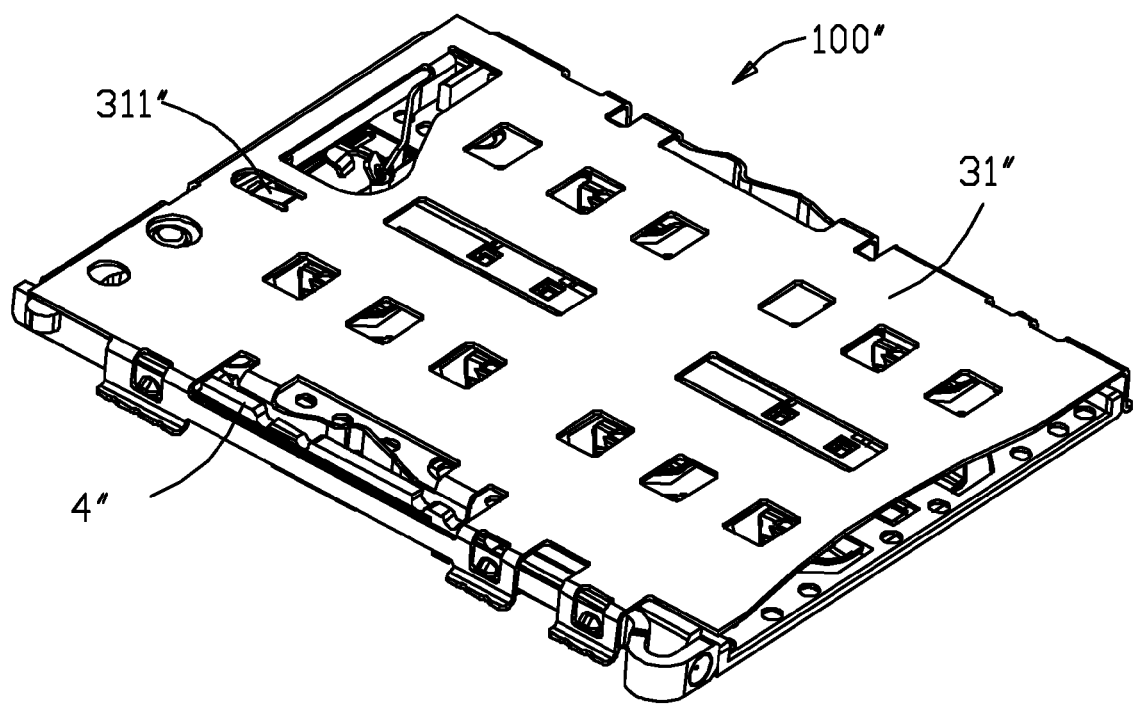
FIG. 11 is a perspective, assembled view of an electronic card connector in a third embodiment.
Figure 12:
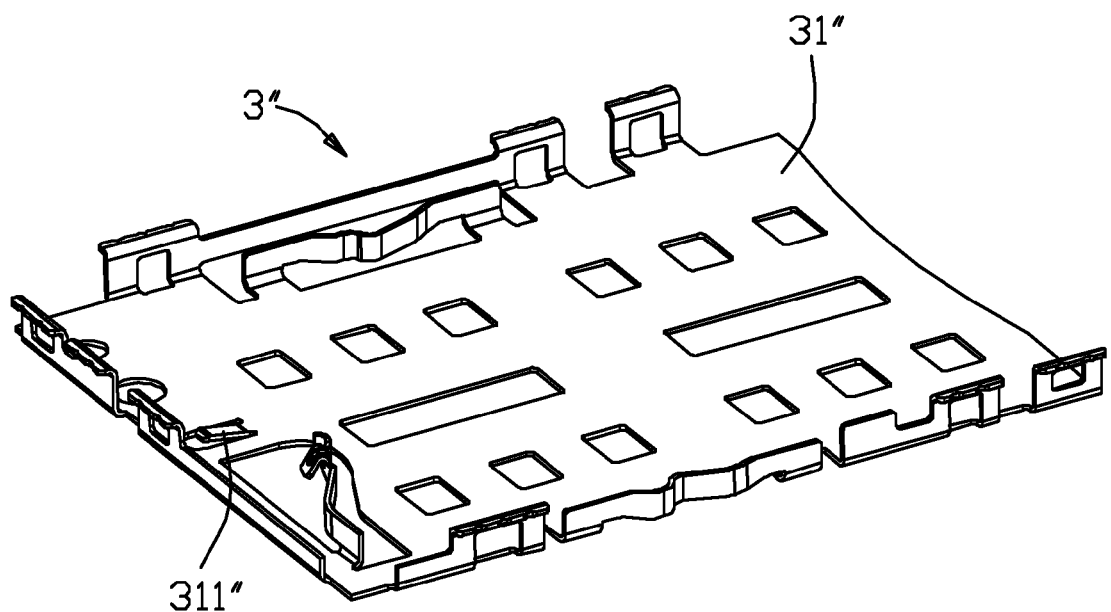
FIG. 12 is a perspective view of a shielding shell in a third embodiment.
Figure 13:
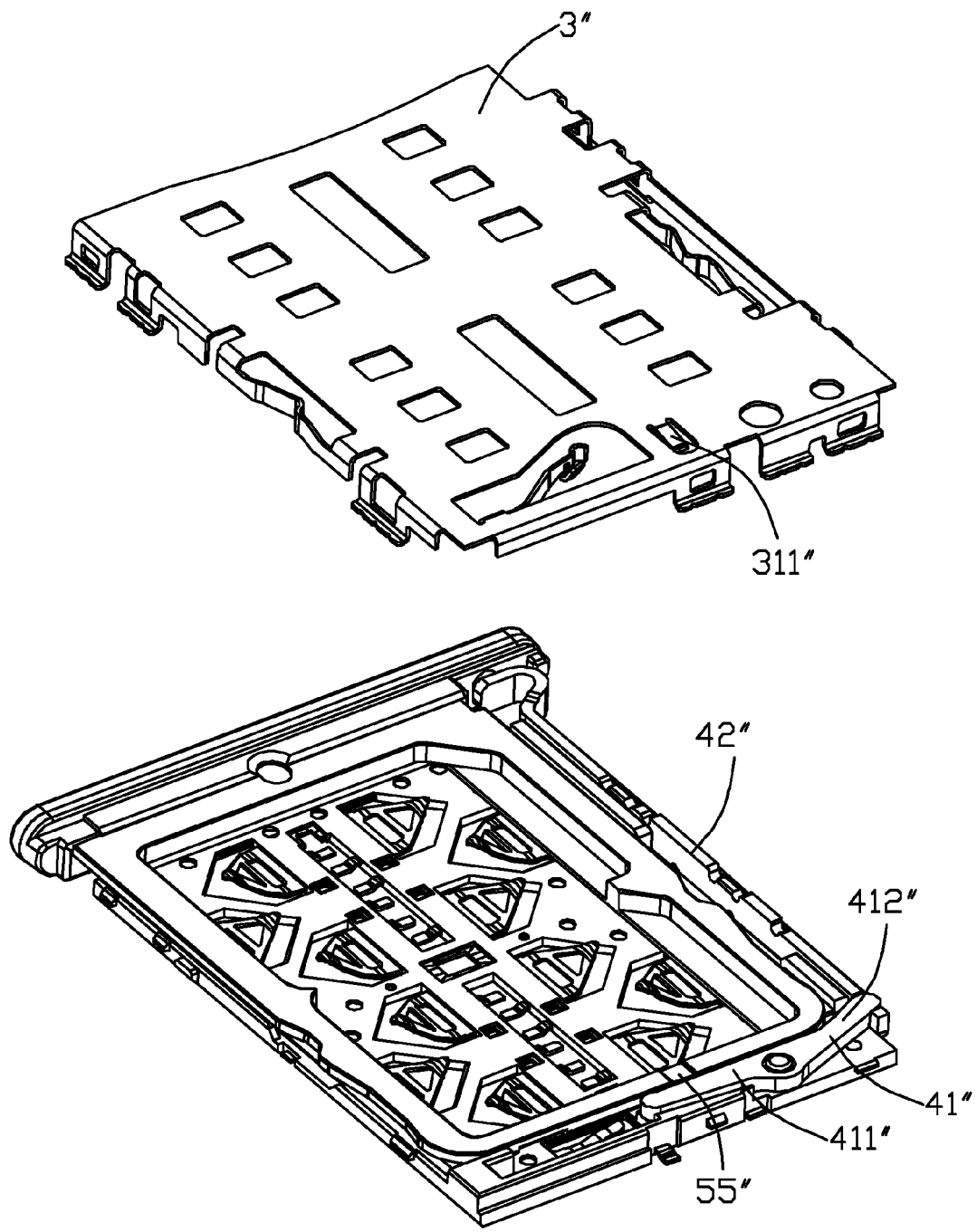
FIG. 13 is a perspective, partly exploded view of the electronic card connector in a third embodiment.

Referring to FIGS. 11 to 13, an electronic card connector 100" in a third embodiment of the present invention includes an insulative housing 1", a number of contacts 22", a shielding shell 3" shielding the insulative housing 1", an ejector 4" received in the insulative housing 1", a tray 5" movably in the insulative housing 1", roughly same as the electronic card connector 100 in the first embodiment except the shielding shell 3". The shielding shell 3" has a top wall 31" and a pair of side walls 32" extending along the insertion direction continuously. The top wall 31" has a resisting portion 311" corresponding to the ejector 4" and inclining downwardly from a free end of the top wall 31". The resisting portion 311" is tore or bulged downwardly from the top wall 3" and a rear end thereof is connected with the top wall 312" while a front end thereof is separated from the top wall 312".

The ejector 4" includes a cam 41" and a lever 42". The cam 41" has a pushing portion 411" and an acting portion 412" linked with the lever 41". The tray 5" has a groove 55" located at a front end thereof and cooperated with the resisting portion 311". In insertion process, the pushing portion 411" is pushed to a front end thereof and the resisting portion 311 is resisted against the pushing portion 421" to decrease sway and static electricity produced by the ejector 4" movable in the insulative housing 1". In ejecting process, the pushing portion 411 is released to withdraw and separated from the resisting portion 311" to attain a good co-planarity.

The electronic card and the tray 5, 5', 5" can be defined as a plug-in component. The side walls 32, 32', 32" and the front wall 30' can be defined as a lateral wall. The shielding shell 3, 3', 3" and the metal sheet 20 can be defined as a metal shell.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector, cooperated with a plug-in component and defining an insertion direction and a transverse direction perpendicular to the insertion direction, comprising:
   an insulative housing;
   a plurality of contacts retained in the insulative housing;
   a metal shell attached to the insulative housing and forming a cavity therebetween, the metal shell having a plurality of walls located at two sides and a front end thereof, one of the walls having a resisting portion protruding to the cavity; and
   an ejector movable in the insulative housing and resisted against by the resisting portion to confine a movement thereof in a horizontal plane, wherein the ejector has a lever and a cam driven by the lever, the metal shell has a metal sheet affixed to the insulative housing and forming a sliding cavity therebetween, and the resisting portion is defined in the metal sheet and protrudes to the sliding cavity to resist against the lever, wherein a width of the sliding cavity is larger than that of the lever along the transverse direction, wherein the metal shell has a shielding shell, the insulative housing has a base portion and a side portion, the metal sheet has a bottom wall and a side wall bent upwardly from the bottom wall and connected with the shielding shell, the sliding cavity is formed by the bottom wall, the side wall, and the side portion, and the resisting portion is located at the side wall, wherein one of the shielding shell and the metal sheet has a plurality of bulges, and the other one has a plurality of holes receiving the bulges, wherein said cam is linked with the lever, and the lever is connected with the metal sheet to connect the cam with the resisting portion indirectly.

* * * * *